(12) United States Patent
Kitajima

(10) Patent No.: US 11,822,974 B2
(45) Date of Patent: Nov. 21, 2023

(54) INFORMATION PROCESSING APPARATUS, CONTROL METHOD OF INFORMATION PROCESSING APPARATUS, AND RECORDING MEDIUM

(71) Applicant: CANON KABUSHIKI KAISHA, Tokyo (JP)

(72) Inventor: Kotaro Kitajima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 17/683,878

(22) Filed: Mar. 1, 2022

(65) Prior Publication Data

US 2022/0300350 A1 Sep. 22, 2022

(30) Foreign Application Priority Data

Mar. 4, 2021 (JP) .................................. 2021-034737

(51) Int. Cl.
| | |
|---|---|
| *G06F 3/00* | (2006.01) |
| *G06F 9/54* | (2006.01) |
| *G06V 40/16* | (2022.01) |
| *H04N 23/71* | (2023.01) |

(52) U.S. Cl.
CPC .............. *G06F 9/54* (2013.01); *G06V 40/171* (2022.01); *H04N 23/71* (2023.01)

(58) Field of Classification Search
CPC ............................ G06F 9/541; G06F 9/45558
USPC ......................................................... 719/310
See application file for complete search history.

(56) References Cited

U.S. PATENT DOCUMENTS

| | | | | |
|---|---|---|---|---|
| 4,987,767 | A * | 1/1991 | Corrigan | G01N 27/622 250/282 |
| 7,496,228 | B2 * | 2/2009 | Landwehr | G06V 10/46 382/165 |
| 10,504,264 | B1 * | 12/2019 | Koenig | G06T 11/001 |
| 2005/0093890 | A1 * | 5/2005 | Baudisch | G09G 5/14 345/639 |
| 2011/0212717 | A1 * | 9/2011 | Rhoads | G06V 10/24 455/418 |

(Continued)

FOREIGN PATENT DOCUMENTS

JP 2005-218507 A 8/2005

OTHER PUBLICATIONS

Thierry Bouwmans, Statistical Background Modeling for Foreground Detection: a Survey. (Year: 2010).*

(Continued)

*Primary Examiner* — Lechi Truong
(74) *Attorney, Agent, or Firm* — Cowan, Liebowitz & Latman, P.C.

(57) ABSTRACT

A portable terminal capable of executing a plurality of applications at the same time comprising a system controller configured to determine whether or not a background application can be executed in the background while the foreground application is being executed and executes the background application in the background, wherein the system controller determines whether or not the background application can be executed in the background based on information about the foreground application and environment suitability information from during the execution of the foreground application.

15 Claims, 8 Drawing Sheets

(56) References Cited

U.S. PATENT DOCUMENTS

| | | | | |
|---|---|---|---|---|
| 2012/0258722 A1* | 10/2012 | Liu | ................ | G06F 9/5022 |
| | | | | 455/450 |
| 2016/0205028 A1* | 7/2016 | Luna | ................ | H04W 4/18 |
| | | | | 709/233 |
| 2016/0352931 A1* | 12/2016 | Asai | ................ | H04N 1/00206 |
| 2016/0371124 A1* | 12/2016 | Kim | ................ | G06F 9/45558 |
| 2019/0245997 A1* | 8/2019 | Kumagai | ................ | G06F 9/48 |
| 2022/0253189 A1* | 8/2022 | Alonso Ruiz | ................ | G06F 3/04883 |

OTHER PUBLICATIONS

M. Fathy, A Window-Based Image Processing Technique for Quantitative and Qualitative Analysis of Road Traffic Parameters. (Year: 1998).*

* cited by examiner

FIG. 3A

| Background application | Execution location | Average usage time condition of background application | Category of target foreground application | Past suitability |
|---|---|---|---|---|
| APP_0003 (Vital measurement) | XXX, XXX | 2 minutes or more | CAT_001 (Web browser) | 0.5 |
| | | | CAT_002 (E-book) | 0.7 |

FIG. 3B

| Background application | Execution location | Average usage time condition of background application | Category of target foreground application | Past suitability |
|---|---|---|---|---|
| APP_0003 (Vital sign measurement from face) | XXX, XXX | 2 minutes or more | CAT_001 (Web browser) | 0.5 |
| | | | CAT_002 (E-book) | 0.7 |
| APP_0024 (Vital sign measurement from fingers) | XXX, XXX | 30 seconds or more | CAT_001 (Web browser) | 0.8 |
| APP_0055 (Posture measurement) | XXX, XXX | 5 minutes or more | CAT_004 (Video) | 0.4 |
| | | | CAT_005 (Music) | 0.2 |
| ... | ... | ... | ... | ... |

INFORMATION PROCESSING APPARATUS, CONTROL METHOD OF INFORMATION PROCESSING APPARATUS, AND RECORDING MEDIUM

BACKGROUND OF THE INVENTION

Field of the Invention

The present invention relates to an information processing apparatus, a control method of the information processing apparatus, and a program.

Description of the Related Art

In recent years, a technique has been proposed that analyzes the state of a user by measuring vital signs such as pulse waves in a non-contact state by using an image that has been captured by a digital camera and the like. For example, Japanese Patent Laid-Open Publication No. 2005-218507 discloses a method for calculating the density of a captured image signal for a region of a specific body part including a chest from an image obtained by capturing images of a subject and measuring their vital signs based on the temporal changes in the density. Accordingly, their vital signs can be measured without wearing a special measuring instrument and the like.

Additionally, in portable terminals such as smart phones, image capturing functions such as digital cameras are typically installed, and images captured using the image capturing functions can be used in various applications. An application that executes the above-described non-contact vital sign measurement by using an image captured by a digital camera installed on a portable terminal is also proposed.

However, a certain amount of measurement time is needed for the stable non-contact measurement of vital signs. Therefore, when an application that performs non-contact vital sign measurement is executed on the portable terminal, the user must wait until the measurement is finished after starting a dedicated vital sign measurement application. Therefore, performing a stable non-contact vital sign measurement using the application of the portable terminal requires a certain measurement time and limits the time and movement of the user during the measurement. Additionally, if the lighting conditions and the like are not suitable for measurement after the start of the vital sign measurement, the measurement fails, and it is necessary to execute the application and perform the measurement operation multiple times. Therefore, when the state of the user is analyzed using applications for a daily-use mobile terminal or the like, it is time-consuming for the user to start the application and perform the measurement for each measurement.

SUMMARY OF THE INVENTION

The present invention reduces the work for the user when using applications for analyzing the user's status.

An information processing apparatus of the present invention comprises at least one processor and/or circuit configured to function as the following units: a determination unit configured to determine whether or not a second application can be executed in a background while a first application is being executed; and an execution unit configured to execute the second application in the background. The determination unit determines whether or not the second application can be executed in the background based on information about the first application and environmental suitability information from during the execution of the first application.

Further features of the present invention will become apparent from the following description of exemplary embodiments with reference to the attached drawings.

BRIEF DESCRIPTION OF THE DRAWINGS

FIGS. 3A and 3B illustrate examples of background execution application lists.

DESCRIPTION OF THE EMBODIMENTS

Figure 1:
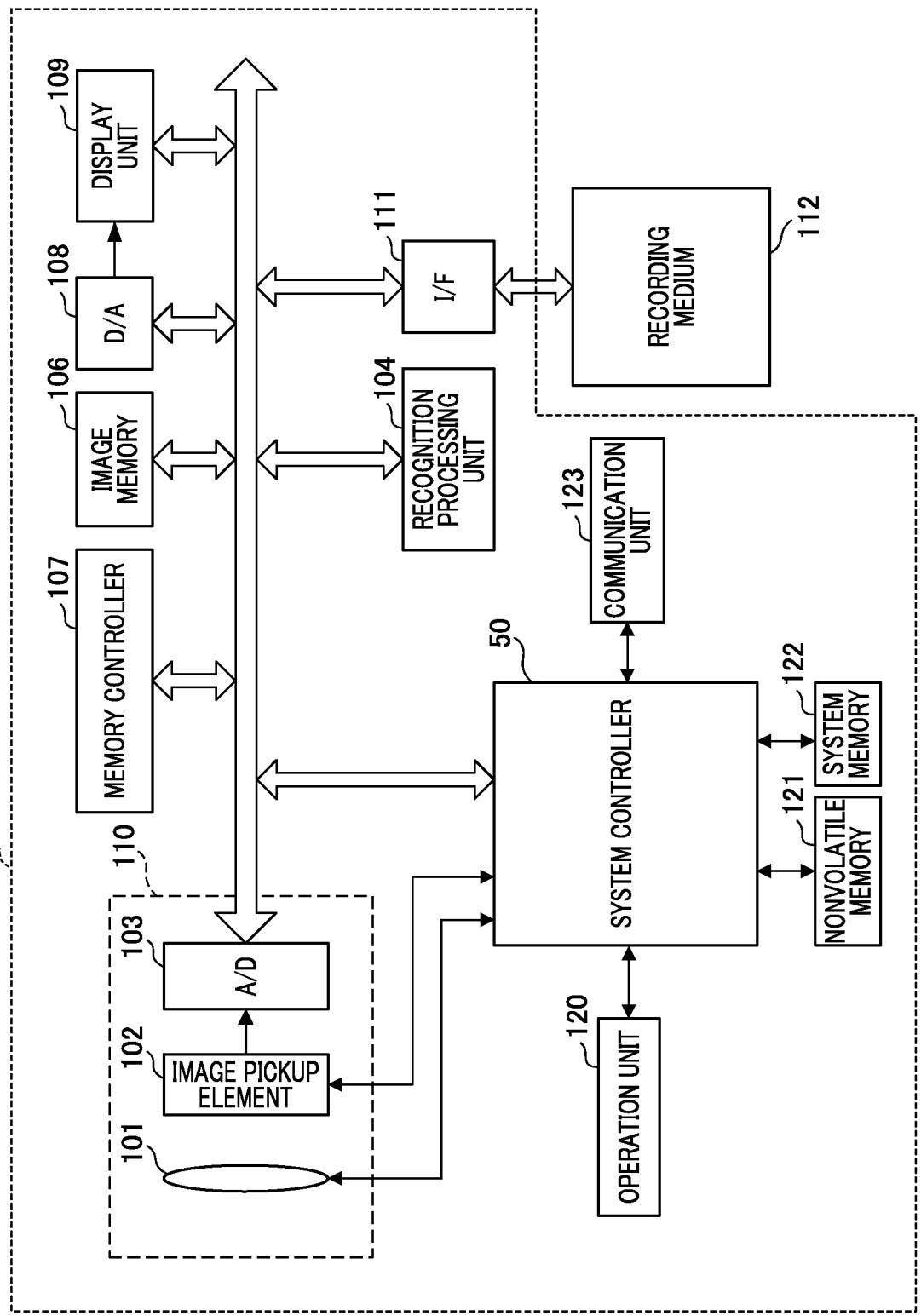
FIG. 1 is a block diagram illustrating a configuration of a mobile terminal.

In the present embodiment, a mobile terminal including an image capturing function, for example, a smart phone with a camera, will be described to serve as an example of an information processing apparatus to which the present invention is applied. FIG. 1 is a block diagram illustrating a configuration example of a mobile terminal with a camera. A portable terminal 100 is an information processing apparatus having an image capturing function. The portable terminal 100 includes an image pickup unit 110, a memory controller 107, a D/A converter 108, a display unit 109, an image memory 106, a recognition processing unit 104, and a recording I/F 111. The portable terminal 100 also includes a system controller 50, an operation unit 120, a nonvolatile memory 121, a system memory 122, and a communication unit 123.

The image pickup unit 110 includes a lens 101, an image pickup element 102, and an A/D converter 103, The lens 101 images an optical image of an object on the image pickup element 102. The image pickup element 102 is a CCD, a CMOS sensor, or the like, and converts the optical image into an electrical signal (analog image signal). The A/D converter 103 converts an analog image signal output from the image pickup element 102 into a digital image signal. The digital image signal (captured image) converted by the A/D converter 103 is displayed on the display unit 109 or recorded on the image memory 106 or a recording medium 112 via the memory controller 107. The captured image includes a still image and a moving image. In the present embodiment, an example in which one image pickup unit 110 is arranged on the same surface as the display unit 109 of the portable terminal 100 has been described. However, a plurality of image pickup units 110 may be provided on the back surface of the portable terminal 100 in addition to the screen side.

The recognition processing unit 104 analyzes the scene, the location of a person, and the like from the captured image. The image memory 106 is a memory for recording captured images. The memory controller 107 controls the image memory 106. The D/A converter 108 is a D/A converter that converts a digital signal into an analog signal. The display unit 109 has a display device, for example, an LCD (Liquid Crystal Display Device) and displays a picked-up image, information about air images-pickup mode of the camera, a preview image before image-pickup, a focus state during focus detection, and the like. The recording I/F 111 is an interface with the external recording medium 112. The recording medium 112 is a recording medium such as a memory card and a hard disk. The recognition processing unit 104 and the memory controller 107 may be realized by the system controller 50.

The system controller 50 is a CPU (Central Processing Unit) and controls the entire system of the portable terminal 100. Additionally, the system controller 50 performs various image processing on the image data output to the image memory 106. Additionally, the system controller 50 controls various applications. The operation unit 120 receives operations from the user. The nonvolatile memory 121 is an EEPROM and the like and stores system programs, application programs, various parameters, and the like of the portable terminal 100. The system memory 122 is a RAM and the like and deploys, for example, constants, variables for operation of the system controller 50, and programs read from the nonvolatile memory 121. The communication unit 123 performs communication with an external device.

The system controller 50 implements the respective processes of the present embodiment to be described below by executing an application program recorded on the nonvolatile memory 121. When the application program is executed, the system controller 50 deploys, for example, constants and variables for operating the system controller 50, and programs read from the nonvolatile memory 121 to the system memory 122 and executes them. The system controller 50 may also operate a plurality of applications in parallel. In the present embodiment, the case in which the application executed by the system controller 50 is a vital sign measurement application, a WEB browser application, an e-book application, and the like will be described as an example.

Next, the basic image-pickup operation in the portable terminal 100 will be described. The image pickup element 102 photoelectrically converts incident light via the lens 101 and outputs the converted light to serve as an input image signal (analog image signal) to the A/D converter 103.

The A/D converter 103 converts the analog image signal that is output from the image pickup element 102 into a digital image signal and outputs the digital image signal to the image memory 106 via the memory controller 107. The system controller 50 performs various image processing such as RGB synchronization processing, color conversion processing including white balance, and γ conversion processing on the image that has been output to the image memory 106.

The image memory 106 stores image data output from the image pickup element 102 and image data for display on the display unit 109. The images recorded in the image memory 106 may be used in various applications that use picked-up images executed by the system controller 50 to be described below.

The D/A converter 108 converts data for image display stored in the image memory 106 into an analog signal and supplies the analog signal to the display unit 109. The display unit 109 performs display on a display device, for example, an LCD according to the analog signal from the D/A converter 108.

Additionally, the system controller 50 stores image data on the recording medium 112 via the recording I/F 111 as needed.

Figure 2B:
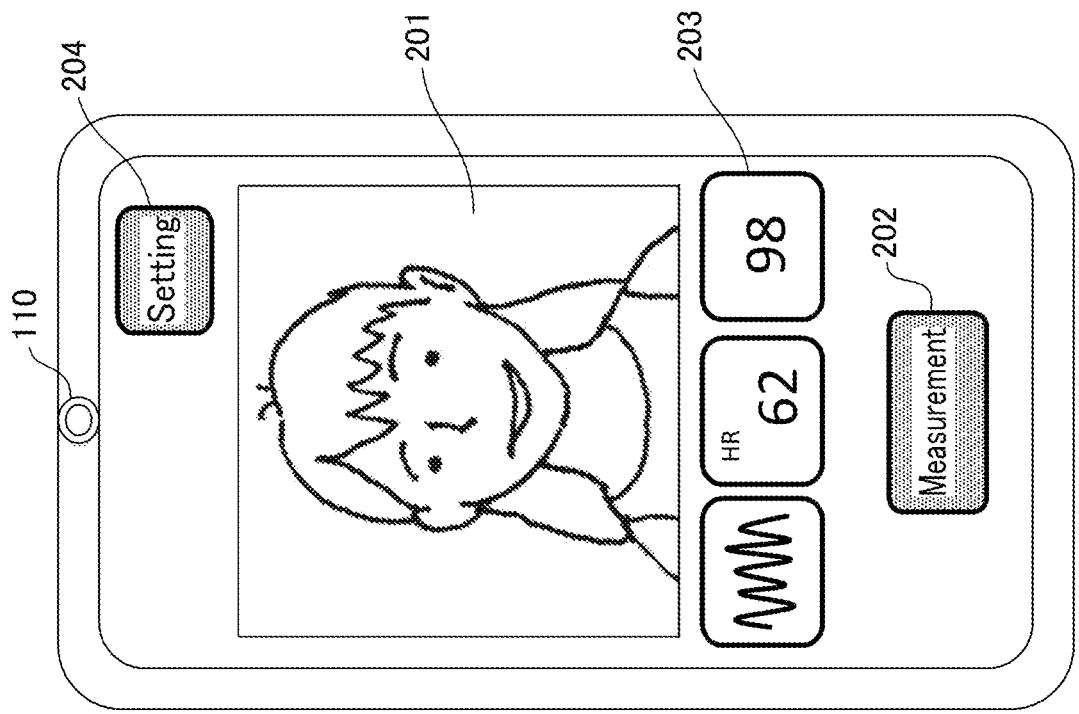
FIGS. 2A to 2D illustrate examples of an image displayed by a mobile terminal.
Figure 2A:
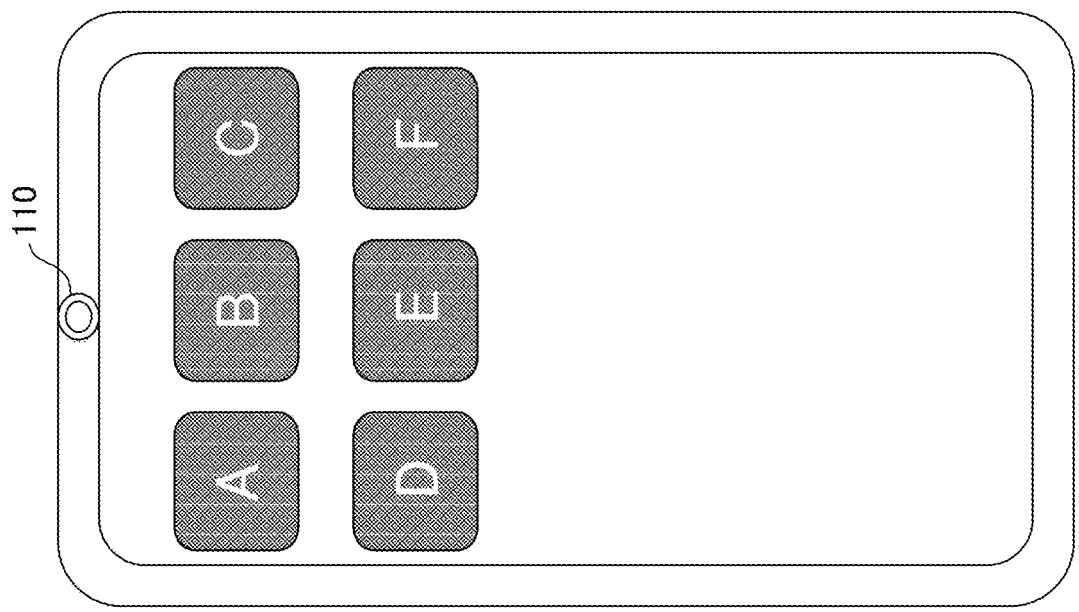

FIGS. 2A to 2D illustrate examples of images displayed by the portable terminal 100. According to the control of the system controller 50, each screen is displayed on the display unit 109. FIG. 2A illustrates an application selection screen. On the application selection screen, icons for a plurality of pre-installed applications (for example, applications A to F) are presented to the user. For example, application A represents a vital sign measurement application, application B represents a WEB browser application, and application C represents are e-book application. When a user selects an arbitrary application, the system controller 50 starts the selected application.

(Vital Sign Measurement Application)

Figure 2C:
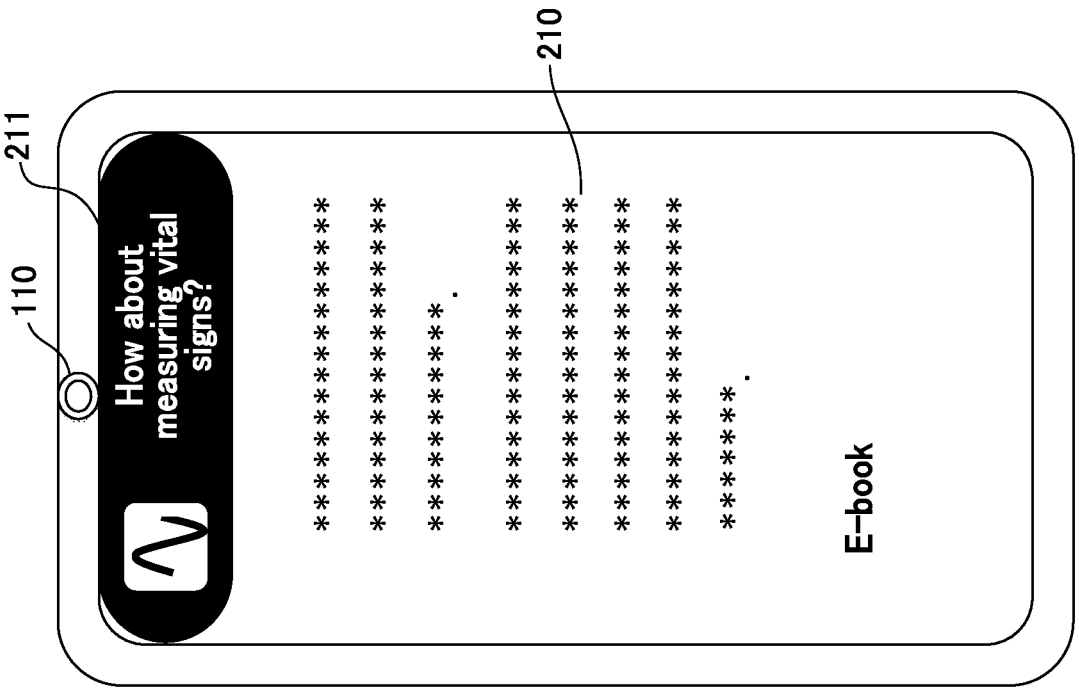

Next, a description will be given of an operation when the user selects the application A (vital sign measurement application) and the system controller 50 executes the vital sign measurement application. The vital signs measurement application is an application that measures and analyzes biological information such as vital signs by using picked-up images. FIGS. 2B and 2C are examples of screens displayed when the vital sign measurement application is used.

When the user selects the vital sign measurement application, the system controller 50 starts the vital sign measurement application. When the vital sign measurement application starts, the system controller 50 operates the image pickup unit 110 to capture an image of a user serving as a vital sign measurement subject. At the same time, the system controller 50 displays a measurement screen on the display unit 109 of the portable terminal 100. FIG. 2B illustrates an example of the measurement screen of the vital sign measurement application.

The lens 101 of the image pickup unit 110 is arranged on the same surface as the display unit 109 of the portable terminal 100. Therefore, the user is able to capture an image of themselves by using the image pickup unit 110 while viewing the screen displayed on the display unit 109.

A picked-up image 201, a measurement start icon 202, a vital sign 203, and a selling icon 204 are displayed on the measurement screen. The picked-up image 201 is an image picked-up by the image pickup unit 110 and displays a user to be measured. The measurement start icon 202 is an icon for starting the measurement of vital signs. The system controller 50 starts the measurement of vital signs when it detects that the user has pressed the measurement start icon 202. The data for the measured vital sign is displayed in the vital sign 203. In the present embodiment, an example of measuring heart rate and blood oxygen concentration as the vital signs is explained. The vital signs to be measured are not limited thereto and may be configured of any kind of vital signs to be measured. Additionally, for the methods for measuring vital signs, known techniques using images are used and any method may be used. In addition to the method of measuring vital signs using images, other measurement methods may be performed.

The setting icon 204 is an icon for setting the vital sign measurement application. When the setting icon 204 is pressed, the system controller 50 displays a setting screen of the vital sign measurement application on the display unit 109. FIG. 2C illustrates an example of the setting screen of the vital sign measurement application. On the setting screen, a background execution icon 205, a category setting 206, an add/delete icon 207, a measurement location setting 208, and an add/delete icon 209 are displayed.

On the setting screen, it is possible to perform settings for executing the vital sign measurement application in the background while another application (foreground application, the first application) is being executed in the foreground. That is, settings for the case in which the vital sign measurement application is executed as a, background application (second application) are performed on the setting screen. The background execution icon 205 is an icon for switching the background execution of the vital sign measurement application ON/OFF. By setting the background execution icon 205 to ON, the vital sign measurement application can be executed in the background while other applications are being executed. When the background execution icon 205 is set to ON, the vital sign measurement application is added to a background execution application list managed by the system controller 50.

FIGS. 3A and 3B illustrate an example of the background execution application list. FIG. 3A illustrates a background execution application list with one background execution application and FIG. 3B illustrates a background execution application list with a plurality of background execution applications. The background execution application list will now be described with reference to FIG. 3A.

The background execution application list is a table in which the startup conditions for the background of the application for each background execution application are associated. The background execution application list includes an identification ID 301, an execution location 302, a time condition 303, a category 304, and a degree of suitability 305 of the application executed in the background. The identification ID 301 is an ID used for uniquely identifying the application. For example, APP_0003 is the identity ID that indicates the vital sign measurement application.

The execution location 302 indicates a location specified to serve as a location for executing the vital sign measurement application in the background. The vital sign measurement application is executed in the background only in the vicinity of the location specified by the execution location 302. The location for executing the vital sign measurement application in the background is set by the measurement location setting 208 on the setting screen of the vital sign measurement application (FIG. 2C).

The measurement location setting 208 is a specification setting for the measurement location and specifies a location for when the vital sign measurement application is executed in the background. For example, if a home location with an advantageous lighting environment that is suitable for vital sign measurement is registered as the measurement location for 208, the vital sign measurement application can be executed in the background only when the user is at home. Thus, it is possible to prevent unnecessary execution of the vital sign measurement in a place where the lighting environment is poor, for example, outdoors, and where the vital sign measurement often fails. The user may add and delete the measurement location setting 208 and may set a location for executing vital sign measurement in the background by pressing the add/delete Icon 209. The location information that is set by the measurement location setting 208 is associated with the background execution application and is managed by the execution location 302 of the background execution application list.

The time condition 303 is information that indicates an average usage, time of the background application. For example, when the time for which the vital sign measurement application is used, that is, the time required for measurement by the vital sign measurement application, is 2 minutes or more, "2 minutes or more" is specified in the time condition 303.

A category 304 indicates an associated foreground application. When the application of the category registered in the category 304 is executed in the foreground, the vital sign measurement can be performed in the background. In the vital sign measurement of the present embodiment, it is necessary to capture an image of the user using the front camera of the portable terminal 100, and a predetermined category to which an application that is assumed to be used by the user by viewing the screen (display unit 109) of the portable terminal 100 belongs is registered in the category 304. That is, categories having characteristics of displaying information on the display unit 109 such as a moving image, an electronic book, and a WEB browser are registered in the category 304.

The example of FIG. 3A indicates that the vital sign measurement application can be executed in the background when an application belonging to the CAT_001 (WEB browser) category or CAT_002 (e-book) category is executed. Therefore, when the user starts the WEB browser in the foreground, the system controller 50 determines whether or not to perform vital sign measurement in the background, and when the system controller 50 makes a determination to perform the vital sign measurement, it executes the vital sign measurement. Similarly, when the user starts the e-book application in the foreground, the system controller 50 determines whether or not to perform the vital sign measurement in the background and when the system controller 50 makes a determination to perform the vital sign measurement, it executes the vital sign measurement.

The category 304 of the foreground application capable of executing the vital sign measurement in the background may be set by default or may be set by the user in the category setting 206 of the setting screen (FIG. 2C) of the vital sign measurement application. For example, the category of the foreground application to be associated with may be set by pressing the add/delete Icon 207. In the example of the category setting 206 of FIG. 2C, the WEB browser and the e-book are registered in the category of the foreground application to be associated with. The category information registered to serve as an application category to be associated with on a setting screen of the vital sign measurement application is managed in association with a background execution application by the category 304 of a background execution application list. In the present embodiment, although the settings for the application category are registered and used to determine whether or not the application can be started in the background, the present invention is not limited thereto. For example, the settings of the application itself can be registered instead of those of the category and used to determine whether or not the application can be started in the background.

The degree of suitability 305 is historical information about a degree of suitability that indicates the extent of the suitability of each foreground application to execute the background application in the background. The degree of suitability 305 is an average value of the suitability that has been calculated in the past and is managed by each foreground application. The calculation method for the degree of suitability will be described below. As described above, as a background application list, the system controller 50 manages the background startup conditions of the applications for which background execution is effective.

(Operation During the Execution of the Foreground Application)

Figure 4:
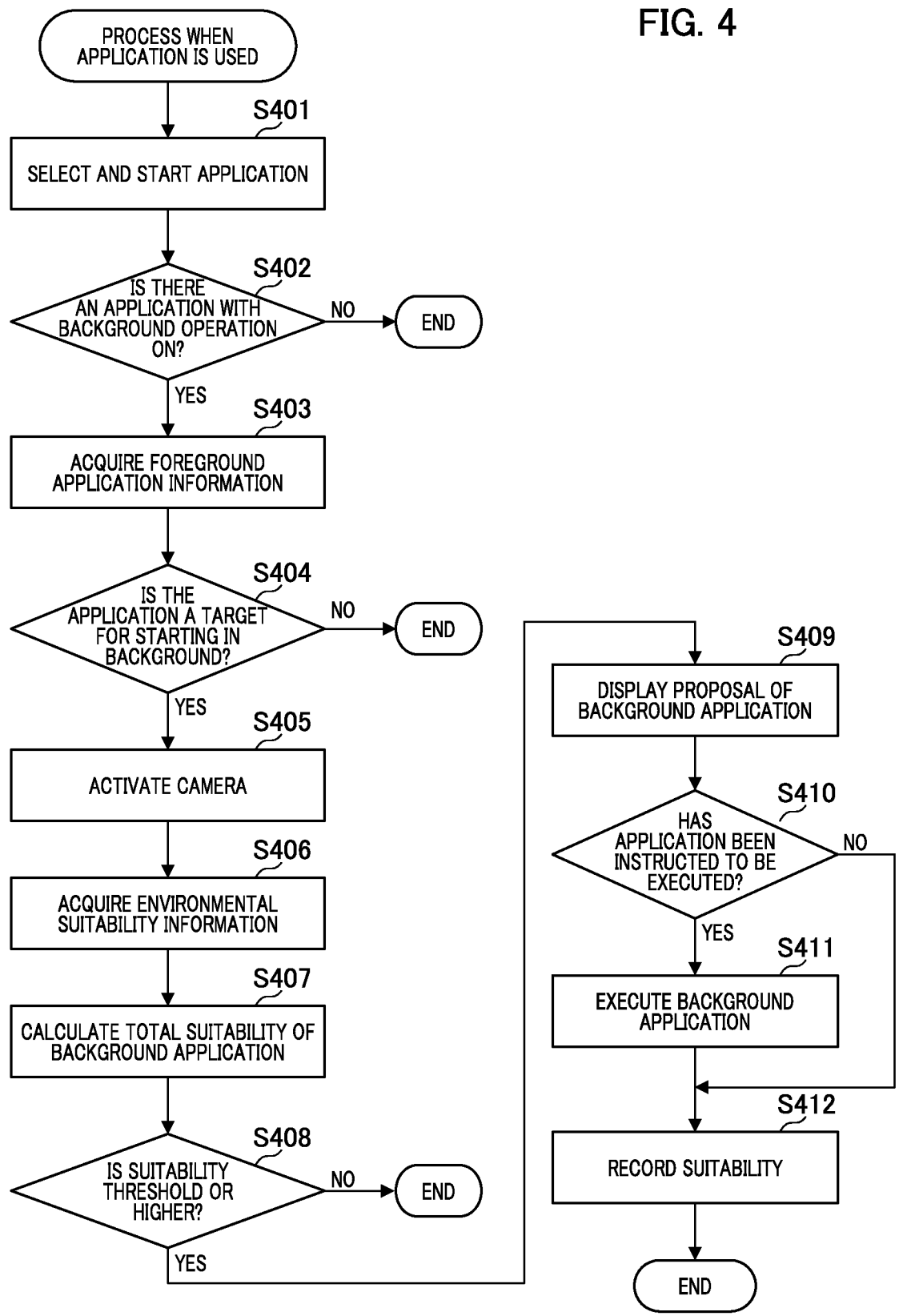
FIG. 4 is a flow chart illustrating a process for determining whether or not a vital sign measurement application can be executed in the background.

Next, a description will be given of a process for determining whether or not the vital sign measurement application can be executed in the background when an application different from the vital sign measurement application is executed in the foreground, FIG. 4 is a flowchart illustrating a process for determining whether or not the vital sign measurement application can be executed in the background. Each process shown in FIG. 4 is realized by the system controller 50 executing a program stored on a readable storage medium, for example, the nonvolatile memory 121, In the description of FIG. 4, an example will be described in which the background application list shown in FIG. 3A is managed by the system controller 50 and the e-book application is selected to serve as the application to be executed in the foreground.

In step S401, the system controller 50 starts the application selected by the user in the foreground. The user selects, for example, an application to be executed in the foreground from among a plurality of applications on the selection screen that is shown in FIG. 2A, The foreground application that is selected here is an application that is different from the vital sign measurement application, for example, an e-book application is selected.

In step S402, the system controller 50 confirms whether or not there is an application for which background operation is effective in the background application list. When an application for which background operation is effective exists in the background application list, the process proceeds to step S403. In contrast, when there is no application for which background operation is effective in the background application list, the process ends and only the foreground application selected in step S401 is executed. In the example of FIG. 3A, the vital sign measurement application is registered to serve as a background operation ON application. When the vital sign measurement application is registered in the background application list shown in FIG. 3A, the process proceeds to step S403.

In step S403, the system controller 50 acquires information about the foreground application selected in step S401. The information about the foreground application is used to determine whether or not the usage state of the application executed in the foreground is suitable for starting the vital sign measurement application in the background. In the present embodiment, the system controller 50 acquires a category of the foreground application and an average usage time of the foreground application to serve as foreground application information. The information about the category of the foreground application and the average usage time are managed by the system controller 50. Furthermore, the system controller 50 acquires the current location information of the portable terminal 100 on which the foreground application is being executed to serve as information about the foreground application that was selected in step S401. The location information is acquired from a GPS (not illustrated) and the like that is built into the portable terminal 100.

In step S404, the system controller 50 determines whether or not the usage state of the application to be executed in the foreground that was selected in step S401 is a usage state that is suitable for starting the vital sign measurement application in the background. The system controller 50 determines whether or not the information about the foreground application acquired in step S403 satisfies the conditions for starting the vital sign measurement application in the background.

In the present embodiment, a description will be given of an example for determining whether or not the usage state of the foreground application is suitable for the startup of the vital sign measurement application in the background according to the startup conditions that are indicated by the four items below.
(1) Whether or not the categories of the foreground applications match.
(2) Whether or not the average use time is at or above a threshold.
(3) Whether or not the past suitability is at or above a threshold.
(4) Whether or not the execution locations match.

In (1), whether or not the application currently being executed in the foreground. (hereinafter, referred to as the foreground application) is an application specified as being able to be execute an application in the background is determined. For example, when using an application for listening to music belonging to the music category, the user will often use the application without looking at the screen (display unit 109), and the image pickup unit 110 may not be able to acquire the images that are necessary for vital sign measurement by capturing images of the user looking at the screen. Therefore, the vital sign measurement application is executed in the background only if the images necessary for the vital sign measurement can be captured. Specifically, when an application of a predetermined category assumed to be used by the user by looking at the screen (display unit 109) of the portable terminal 100 is executed in the foreground, control is performed to execute the vital sign measurement application in the background. Specifically, the system controller 50 determines whether or not the category of the foreground application is included in the category 304 of the background execution application list. For example, if the application that was started in step S401 is an e-book application, the system controller 50 determines that the foreground application is included in the category 304 of the background execution application list.

In (2), it is determined whether or not the average usage time of the foreground application is equal to or greater than the average usage time of the background application corresponding to the foreground application. A predetermined measurement time is necessary for the vital sign measurement, and the measurement may fail if the usage of the application in the foreground does not satisfy the measurement time. Therefore, the vital sign measurement application is executed in the background only if the average usage time of the foreground application is equal to or greater than the average measurement time of vital sign measurement. Specifically, the system controller 50 determines whether or not the average usage time of the foreground application satisfies the conditions of the time condition 303 of the background execution application list. For example, when the average use time of the e-book application as the foreground application is 20 minutes, the system controller 50 determines that the time condition 303 of the vital sign measurement application, that is, two minutes or more, is satisfied.

In (3), it is determined whether or not the foreground application is suitable for executing the vital sign measurement application in the background. Specifically, the system controller 50 determines whether or not the value of the past degree of suitability 305 corresponding to the foreground application in the background execution application list is equal to or higher than a predetermined threshold. For example, when the threshold of the degree of suitability is 0.5, the past degree of suitability 305 of the e-book application, which is the foreground application, is 0.7 and therefore the value is determined to be equal to or higher than the threshold.

In (4), whether or not the location where the portable terminal 100 exists is included within the range of the measurement location specified by the vital sign measurement application is determined. Specifically, the system controller 50 determines whether not the current location of the portable terminal 100 is included in the execution location 302 of the background execution application list. For example, when a home is included in the execution location 302 of the background execution application list and the current location information of the portable terminal 100 indicates a location in the home, it is determined that the portable terminal 100 is included in the range of the execution location 302.

In the present embodiment, when all the conditions of the above four items are satisfied, the system controller 50 determines that the application being executed in the foreground is an application that is suitable for starting the vital sign measurement application in the background. When it is determined that the foreground application is an application that is suitable for starting the vital sign measurement application in the background, the process proceeds to step S405.

In contrast, if the foreground application is not suitable for starting the vital sign measurement application in the background, the process ends and only the foreground application is executed. In addition, in the present embodiment, although an example of determination by using the four items in step S404 has been described, the determination may be performed by using some of the four items or by adding other conditions. Additionally, the information collected in step S403 may be changed according to the determination items in step S404.

In steps S405 to S407, the state of the user serving as the object and the state of the ambient light are analyzed by using the image pickup unit 110, and whether or not they are suitable for executing the vital sign measurement application in the background is determined. In step S405, the system controller 50 starts the image pickup unit captures an image of the user of the portable terminal 100 for a predetermined time (for example, 10 seconds) and acquires the captured image.

In step S406, the system controller 50 analyzes the image acquired in step S405 and acquires environmental suitability information. In addition to the image, the system controller 50 may also use information obtained when the image is picked up. The environmental suitability information is evaluation information for determining whether or not the state of the object or the image capturing environment is suitable for executing an application, that is, whether or not the state is suitable for executing vital sign measurement, in the background. The environmental suitability information includes object characteristic information (object information) and ambient light characteristic information (ambient light information). The object characteristic information is information about the state of the object, for example, a location relation between the user serving as an object and the portable terminal 100, the user's posture such as the user's face size and the user's face direction, which are caused by the location relation, changes in this location or posture, and changes in the user's facial expression. The ambient light characteristic information is information about ambient light, for example, the brightness of the ambient light during image capturing that is represented by the brightness of the user serving as an object, the color temperature, the state of the light reflected by the user, and variations in the brightness of the ambient light. In the present embodiment, examples of calculating (1) the degree of suitability of a facial region and (2) the degree of object variation suitability, which serve as object characteristic information, and examples of calculating (3) the degree of the illuminance suitability of the ambient light, (4) the degree of suitability of specular reflection, and (5) the degree of suitability of the variation of the ambient light, which serve as ambient light characteristic information, will be described. Each degree of suitability is calculated as a value from 0 to 1. These are examples of environmental suitability information, and other indicators may be used if they are suitable for determining whether or not the conditions are suitable for vital sign measurement.

Figure 5:
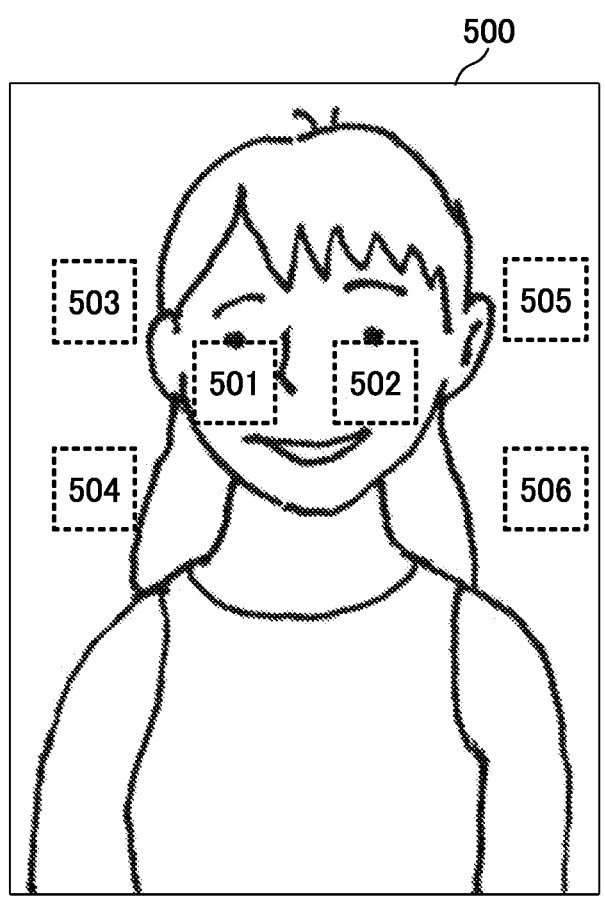
FIG. 5 illustrates the degree of suitability for environmental suitability information.

A method for calculating a degree of suitability of the environmental suitability information will be described with reference to FIG. 5 and FIG. 6A to FIG. 6G. FIG. 5 illustrates the degree of suitability of the environmental suitability information. FIGS. 6A to 6G illustrate calculation characteristics of the degree of suitability. A picked-up image 500 is an image of the user of the portable terminal 100 captured by the image pickup unit 110 in step S405. The system controller 50 sets an acquisition region for the degree of suitability based on the positions of the face, eyes, nose, and mouth. Specifically, the system controller 50 first causes the recognition processing unit 104 to detect the center position of the user's face and the positions of the eyes, nose, and mouth.

Based on the detected positions of the face, eyes, nose, and mouth, a plurality of region frames for acquiring the degree of suitability are set. A facial region frame 501 and a facial region frame 502 show a facial region of the object (user). For example, based on the positions of the face, eyes, nose, and mouth detected by the recognition processing unit 104, the facial region frame 501 is set around the right cheek and the facial region frame 502 is set around the left cheek. A background region frame 503 is set as a background region on the upper right of the right ear of the object, a background region frame 504 is set as a background region on the lower right of the right ear of the object, a background region frame 505 is set as a background region on the upper left of the left ear of the object, and a background region frame 506 is set as a background region on the lower left of the left ear of the object.

(1) The suitability of a facial region of the object characteristic information is an evaluation value that indicates the degree to which the facial region is included in the facial region frame 501 and the facial region frame 502 that have been set. The degree of suitability of the facial region is used to evaluate whether or not the position and posture of the user, who is the object of the image, are suitable for image capturing for vital sign measurement. In the present embodiment, whether a specific region (for example, a facial region) that is a target for the object of the vital sign measurement can be imaged is evaluated based on an exposure ratio of the specific region, in order to determine whether or not the state of the object is suitable for executing vital sign measurement.

Figure 6A:
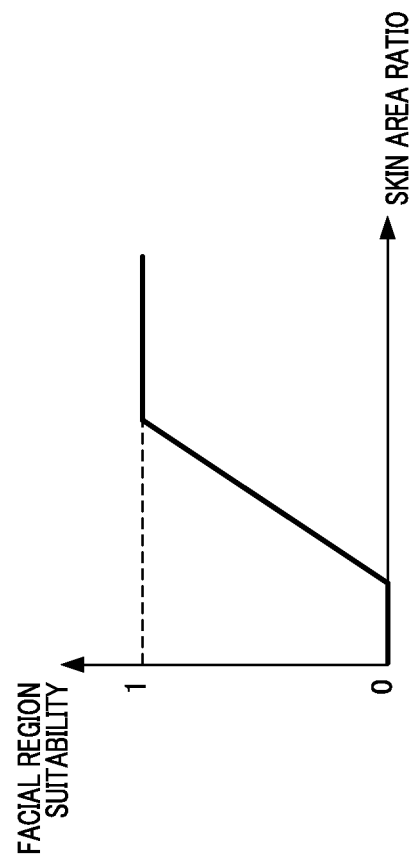
FIGS. 6A to 6G illustrate calculation characteristics for the degree of suitability.

First, the system controller 50 calculates a ratio of the skin colored region to the set facial region frames (501, 502) to serve as the skin area ratio. For example, when the facial region is covered by an object or hair, the skin area ratio decreases, while when the facial region is not covered, the skin area ratio increases. Next, the system controller 50 calculates a facial region degree of suitability based on the skin area ratio. For example, the facial region degree of suitability is calculated by using the characteristics of the facial region degree of suitability chart that is shown in FIG. 6A. In the facial region degree of suitability chart, the horizontal axis represents the input skin area ratio, and the vertical axis represents the output degree of facial region suitability. When the skin area ratio is between 0 and a first ratio, the degree of facial area suitability is 0, and when the skin area ratio is between the first ratio and a second ratio that is higher than the first ratio, the facial region degree of suitability increases as the skin area ratio increases, and when the skin area ratio is equal to or higher than the second ratio, the facial region degree of suitability is 1. As the skin area ratio increases, the value of the facial region degree of suitability increases, which is a state that is suitable for vital sign measurement. In contrast, a case in which the facial region is blocked by an object or hair is not suitable for measuring vital signs, and therefore the facial region degree of suitability decreases.

The degree of object variation suitability of the object characteristic information is an evaluation value that indicates a movement of the object. For example, the degree of object variation suitability is calculated based on a facial expression change amount, a face direction change amount, and a background change amount. The facial expression change amount is an index that increases when the facial expression of the object (user) changes with time and decreases when the facial expression of the object does not change. The system controller 50 calculates the facial expression change amount based on a temporal change amount of the relative relation between the positions of the eyes, nose, and mouth detected by the recognition processing unit 104. When the temporal change amount of the relative relation between the positions of the eyes, nose, and mouth are large, the facial expression change amount is large.

The facial direction change amount is an index that increases when the facial direction of the object (user) changes with time and decreases when the facial direction does not change. The system controller 50 calculates a facial direction based on the positions of the eyes, nose, and mouth detected by the recognition processing unit 104 and calculates a facial direction change amount based on a temporal change amount of the facial direction. When the temporal change amount of the facial direction increases, the change amount of the facial direction increases, and when the facial direction is constant, the change amount of the facial direction decreases.

The background change amount is an index that increases when the background of the object (user) changes with time and decreases when there are few changes to the background. The system controller 50 calculates the background change amount based on a temporal variation amount of the luminance of the background region frames 503 to 506. When the temporal change of the luminance of the background region is large, the background variation increases, and when the luminance of the background region is constant, the background variation decreases.

Figure 6B:
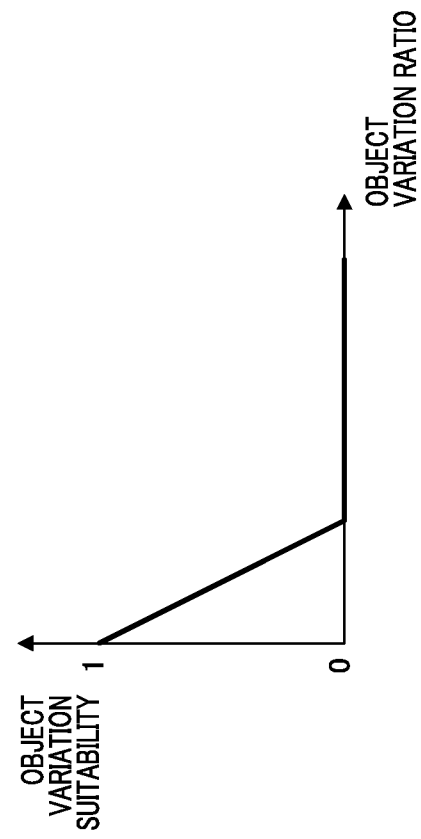
Figure 6C:
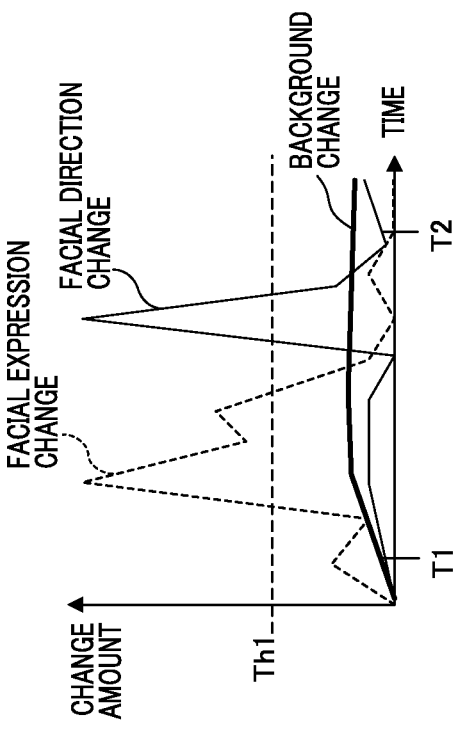
Figure 6D:
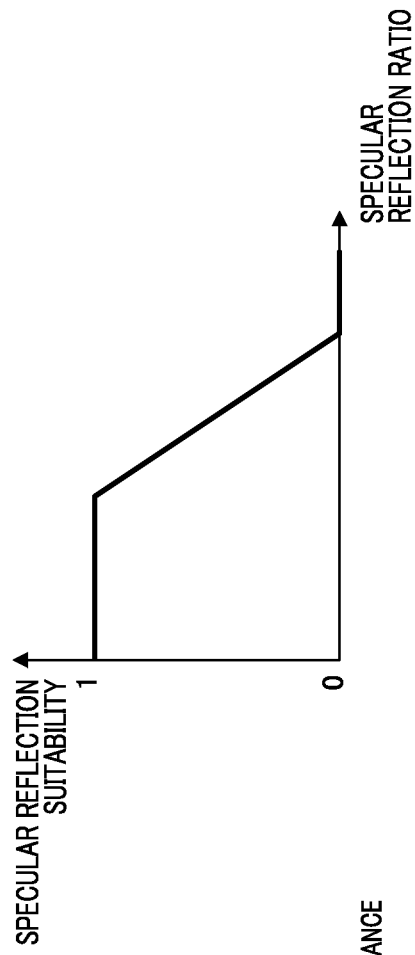

FIG. 6B is an object variation chart showing an example of temporal changes in the facial expression charge amount, the facial direction change amount, and the background change amount. In the object variation chart, the horizontal axis represents time, and the vertical axis represents the facial expression change amount, the facial direction change amount, and the background change amount. The system controller 50 calculates a time ratio when any one of the facial expression change amount, the facial direction change amount, and the background change amount is higher than the threshold Th1 within a predetermined time interval ΔT to serve as an object variation ratio. The predetermined time interval ΔT is, for example, T2-T1.

Next, the system controller 50 calculates the degree of object variation suitability based on the calculated object variation ratio. For example, the degree of object variation suitability is calculated by using the characteristics of the degree of object variation suitability chart shown in FIG. 6A. In the degree of object variation suitability chart, the horizontal axis represents the input object variation ratio, and the vertical axis represents the output degree of object variation suitability. When the object variation ratio is 0, the degree of object variation suitability is 1, and when the object variation ratio is between 0 and the first ratio, the degree of object variation suitability decreases as the object variation ratio increases. When the object variation ratio exceeds the first ratio, the degree of object variation suitability becomes 0. Thus, when the variation ratio of the object is low, the degree of object variation suitability increases, which is suitable for vital sign measurement. In contrast, a case in which the object makes large movements is not suitable for measuring vital signs, and therefore the degree of object variation suitability becomes lower.

(3) The illuminance suitability of the ambient light of the object characteristic information is an evaluation value that indicates the brightness of the facial region of the object. The system controller 50 calculates the degree of illuminance suitability based on the illuminance of the object. Specifically, first, the system controller 50 calculates the illumination intensities of the facial region frame 501 and the facial region frame 502 based on the captured image or the exposure parameter of the image pickup unit 110.

Next, the system controller 50 calculates the degree of illuminance suitability based on the calculated illuminance for the facial region frame 501 and the facial region frame 502. For example, the degree of illuminance suitability is calculated by using the characteristics of the degree of illuminance suitability chart shown in FIG. 6A. In the degree of illuminance suitability chart, the horizontal axis represents the input illuminance, and the vertical axis represents the output degree of illuminance suitability. The input illuminance is, for example, the average of the illumination intensities for the facial region frame 501 and the Facial region Frame 502. The degree of illuminance suitability is 0 when the illuminance is between 0 and a first value, and it increases with increases in illuminance when the illuminance is between the first value and a second value that is higher than the first value. The degree of illuminance suitability is 1 when the illuminance is between the second value and a third value that is higher than the second value and decreases with increases in illuminance when the illuminance is between the third value and a fourth value that is higher than the third value. When the illuminance is the fourth value or more, the degree of illuminance suitability is 0. Thus, the degree of illuminance suitability increases in situations in which the illuminance is neither too dark nor too bright which is a state that is suitable for vital sign measurement. In contrast, cases in which the illuminance is too dark or too bright are not suitable for vital sign measurement, and therefore the degree of illuminance suitability decreases.

(4) The degree of suitability of specular reflection of the object characteristic information is an evaluation value that indicates the reflection of the facial region of the object. The system controller 50 calculates the degree of suitability of specular reflection based on the ratio of specular reflection pixels in the facial region of the object. Specular reflection pixels are, for example, pixels whose luminance is higher than the average luminance of the facial region by a predetermined ratio or more. Specular reflection pixels may be used as pixels that are above a predetermined luminance. Specifically, first, the system controller 50 calculates an average value of the luminance for the facial region frame 501 and the facial region frame 502. Subsequently, in the facial region frame 501 and the facial region frame 502, the system controller 50 calculates a ratio of pixels having a luminance that is higher than the calculated average value by a predetermined ratio or more to serve as a specular reflection ratio.

Figure 6E:
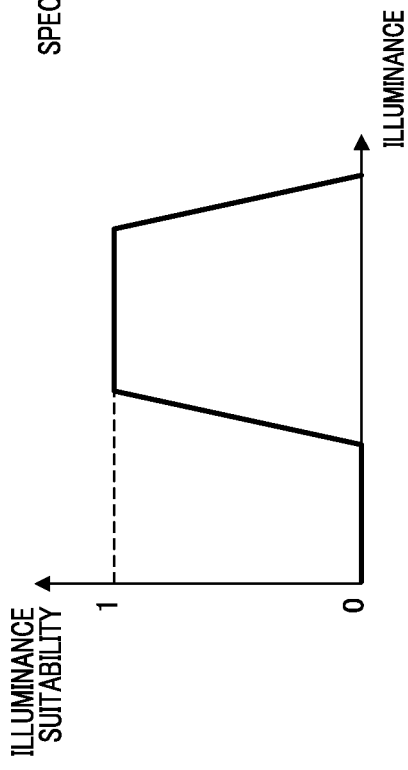

Next, the system controller 50 calculates the degree of specular reflection suitability based on the calculated specular reflection ratio. For example, the degree of specular reflection suitability is calculated by using the characteristics from the degree of specular reflection suitability chart that is shown in FIG. 6E. In the degree of specular reflection suitability chart, the horizontal axis represents the input specular reflection ratio, and the vertical axis represents the output degree of specular reflection suitability. When the specular reflection ratio is between 0 and the first ratio, the degree of specular reflection suitability is 1, and when the specular reflection ratio is between the first ratio and a second ratio that is higher than the first ratio, the degree of specular reflection suitability decreases with increases in the specular reflection ratio. When the specular reflection ratio exceeds the second ratio, the degree of specular reflection suitability is 0. Thus, when the specular reflection ratio is low, the degree of specular reflection suitability increases, which is a suitable state for vital sign measurement. In contrast, because specular reflection pixels are not suitable for vital sign measurement, when the specular reflection ratio is high, the degree of specular reflection suitability is low.

Figure 6F:
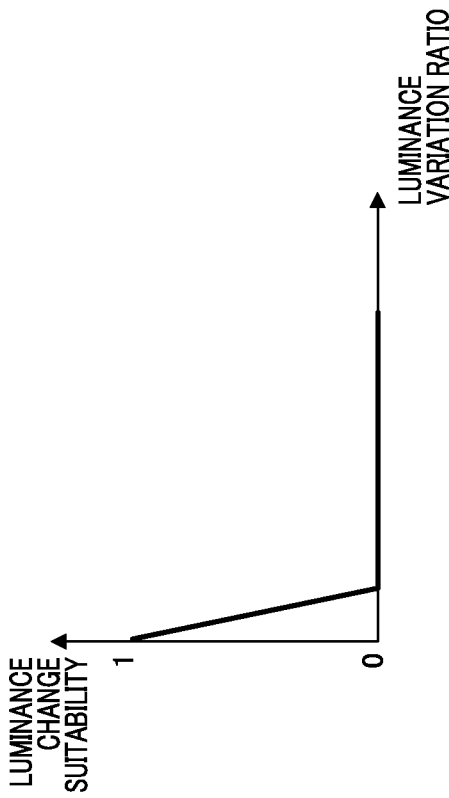
Figure 6G:
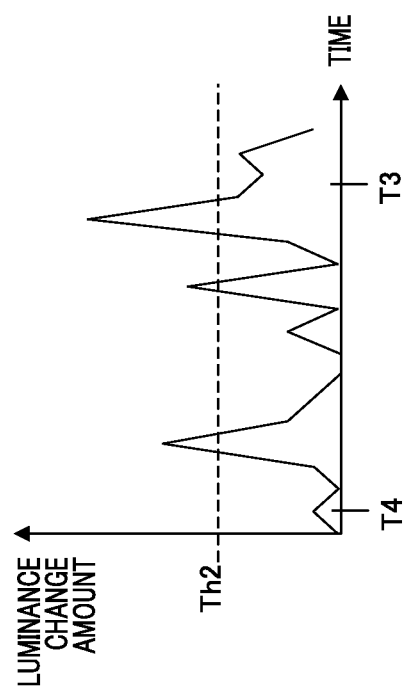

(5) The degree of luminance change suitability of the ambient light of the object characteristic information is an evaluation value that indicates the temporal changes in the luminance of the facial region of the object. The system controller 50 first calculates an amount of the temporal changes in luminance for the facial region frame 501 and the facial region frame 502. The system controller 50 calculates a time ratio when the calculated temporal change amount for the luminance is greater than the threshold Th2 within a predetermined time interval ΔT to serve as the luminance variation ratio. FIG. 6F is a luminance variation chart showing an example in which the luminance change amount changes with time. In the luminance variation chart, the horizontal axis represents time, and the vertical axis represents the luminance change amount. The predetermined time interval ΔT is, for example, T4-T3.

Next, the system controller 50 calculates the degree of luminance change suitability based on the calculated luminance variation ratio. For example, the degree of suitability of the luminance change is calculated by using the characteristics from the degree of luminance change suitability chart that is shown FIG. 6G. In the degree of luminance change suitability chart, the horizontal axis represents the input luminance variation ratio, and the vertical axis represents the output degree of luminance change suitability. When the luminance variation ratio is 0, the degree of luminance change suitability is 1, and when the luminance variation ratio is between 0 and the first ratio, the degree of luminance change suitability decreases with increases in the luminance variation ratio. When the luminance variation ratio exceeds the first rate, the degree of luminance change suitability becomes 0. Thus, when the luminance variation ratio is low, the degree of luminance change suitability increases, which is a state that is suitable for vital sign measurement. In contrast, cases in which the luminance variation ratio is large, for example, outdoors where the ambient light changes significantly, are not suitable for measuring vital signs, and therefore the degree of luminance change suitability is low.

In step S406, as described above, environmental suitability information is acquired by calculating (1) the degree of suitability of the facial region, (2) the degree of the variation suitability of the object, (3) the degree of the illumination suitability of the ambient light, (4) the degree of suitability of specular reflection, and (5) the degree of the variation suitability of ambient light. In step S407, the system controller 50 calculates the total degree of suitability based on the environmental suitability information. Specifically, the system controller 50 multiplies all of the degrees of suitability for each of (1) to (5) that were calculated in step S406 and sets the result as the degree of total suitability. In step S408, the system controller 50 determines whether or not the degree of total suitability is equal to or greater than a predetermined threshold. When the total suitability is equal to or greater than the predetermined threshold, the environment is suitable for the measurement of vital signs, and the process proceeds to step S409. In contrast, when the degree of total suitability is lower than the threshold, the environment is not suitable for the measurement of vital signs, and the process ends and only the foreground application selected in step S401 is executed.

Figure 2D:
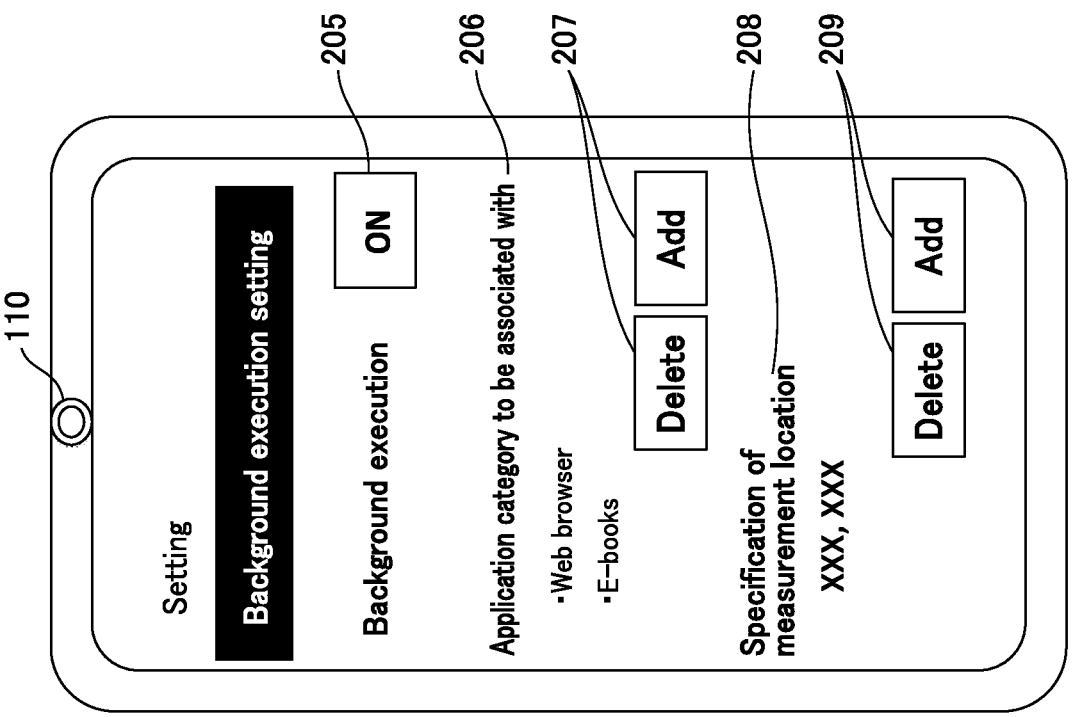

In step S409, the system controller 50 displays, on the display unit 109, a display that proposes execution of the vital sign measurement application serving as a background application to the user. FIG. 2D illustrates an example of a screen that proposes execution of the vital sign measurement application in the background. A proposal icon 211 that proposes execution of vital sign measurement is superimposed on a screen 210 of an e-book application serving as an application being executed in the foreground. When the proposal icon 211 is pressed by the user, the vital sign measurement application is executed in the background.

In step S410, the system controller 50 determines whether or not an instruction to execute vital sign measurement in the background has been provided. Specifically, the system controller 50 determines whether or not the instruction to execute vital sign measurement in the background has been provided based on whether or not the user has pressed the proposal icon 211. When the user has pressed the proposal icon 211 and the instruction for executing vital sign measurement in the background has been provided, the process proceeds to step S411. In contrast, when the proposal icon 211 has not been pressed, the process proceeds to step S412.

In step S411, the system controller 50 starts the vital sign measurement application in the background and executes vital sign measurement. In step S412, the system controller 50 applies the degree of total suitability based on the environmental suitability information that was calculated in step S407 to the degree of suitability 305 of the background application list and records the degree of total suitability. Specifically, the system controller 50 calculates an average value between the past degrees of suitability recorded in the background application list and the degree of total suitability that has been newly calculated in step S407, and updates and records the calculated average value to serve as the new degree of total suitability.

As described above, in the present embodiment, whether or not the vital sign measurement application can be executed in the background is determined during the execution of the foreground application based on the information regarding the foreground application and the environmental suitability information that was obtained by capturing images of the user. This allows the user to eliminate the time-consuming operation of starting the vital sign measurement application and performing the measurement. Additionally, since the vital sign measurement is performed only in cases that have been determined to be suitable for executing the background vital sign measurement application, it can be performed without using unnecessary power or processing loads.

In the present embodiment, although the vital sign measurement application has been described as an example of an application executed in the background, any application may be used if it is an application that uses an image that has been captured by the portable terminal 100. For example, the present invention can be applied to applications for analyzing the state of the user, such as an application for analyzing the user's posture and an application for analyzing the user's stress levels.

Additionally, in the present embodiment, the category and the average utilization time and the like of the application are acquired, which serve as the foreground application information that is acquired in step S403, in order to determine whether or not the application can be executed in the background. However, the acquired foreground application information is not limited to such information and any information about the foreground application may be used. For example, it is possible to perform the determination based on identification information such as an ID of each foreground application instead of a category, or it is also possible to add processing for performing determination based on information indicating the average movement of the portable terminal 100 when the foreground application is being executed. For example, for applications such as a game application for which the terminal is moved significantly when the application is used, control may be performed to determine that the application is not suitable for performing vital sign measurements in the background.

Additionally, the information managed in the background application list can also be changed according to the foreground application information to be acquired. For example, when the application D is acquired as the foreground application information, the background application list manages the application ID instead of or in addition to the category 304, Additionally, when the movement information of the portable terminal 100 is acquired to serve as the foreground application information, the movement information is also managed in the background application list. These background application lists are used in, for example, the determination in step S404.

In the present embodiment, in step S406, although examples of obtaining the degree of illumination suitability of the ambient light, the degree of specular reflection suitability, and the degree of variation suitability of the ambient light have been described as the environmental suitability information, the present invention is not limited thereto. For example, a configuration may be used that determines whether or not the application is suitable for vital sign measurement based on the color temperature of the ambient light and the angle of the ambient light (for example, a degree of oblique light). In this case, if the color temperature of the ambient light is extremely high or extremely low, the vital signs may not be measured correctly, and therefore control is performed to prevent background execution. Additionally, even in the case of strong oblique light, the brightness between the face area frame 501 and the face area frame 502 of the user may be significantly different and it is possible that the accuracy of the vital sign measurement may decrease, and therefore control is performed to prevent background execution.

In the present embodiment, although, in step S409, an example has been described in which execution of the application in the background is proposed to the user in a case that has been determined to be suitable for execution, a configuration can be adopted that omits step 409 and step 410, and automatically performs background execution without proposing it to the user. In this case, operations that are time-consuming for the user can be further eliminated.

In the present embodiment, although an example of registering one application in the background application list has been described, a plurality of applications may be registered in the background application list. When a plurality of applications are registered in the background application list, a configuration can be adopted that selects one candidates from the background applications and proposes this application to the user.

An example in which there are a plurality of applications registered in the background application list is shown in FIG. 3B, In the example of FIG. 3B, in addition to the application that detects vital signs from facial images (APP_003). APP_0024 and APP_0055 are registered as background applications 306. APP_0024 is an application that detects vital signs from an image of a finger. APP_0055 is a posture measurement application that measures the correctness of a user's posture.

The application that detects vital signs from an image of a finger is, for example, an application in which vital signs are detected based on a temporal variation amount of luminance of the finger in the image, in which the finger is irradiated with LED light (not illustrated) while being pressed on the image pickup unit 110. Compared to the method of detecting vital signs from facial images, the method of detecting vital signs from the image of a finger enables measurement even when the variation amount of the user's face is high or when the changes in ambient light are significant. However; the finger needs to be in close contact with the mobile terminal in order to perform this measurement. A posture detection application acquires an image of the user's upper body and evaluates and utilizes the correctness of the posture. The application uses images of the user's upper body, and therefore the mobile terminal needs to be used in a state in which the upper body of the user is visible in order to execute the application in the background.

The system controller 50 manages the execution location 302, the category 304, the time condition 303, and the degree of suitability 305 of the three applications in the background application list. When the foreground application starts, the system controller 50 selects the application that is the most suitable for execution in the background in the current state from among the plurality of applications registered in the background application list. Specifically, first, in step S404, whether or not an application is an application that is an object for starting in the background of the foreground application that is currently being executed is determined. When the application is determined to be an object for starting the background, the degree of suitability of each background application is calculated in steps S405 to S408. The conditions for determining whether or not the application is suitable for background execution are different depending on each application, and the degree of suitability of each background application is calculated by executing a usage environment determination program that is included in each application. For example, in the application that detects vital signs from an image of a finger, whether or not the mobile terminal is being held by the user's hand is detected based on movement information from the mobile terminal and a captured image. In the posture measurement application, whether or not the mobile terminal is being used in a state in which the upper body can be captured is detected from the captured image. Accordingly, the system controller 50 executes processing for calculating the degree of suitability of the candidates for each background application and selects the application that is the most suitable for background execution based on the degree of suitability. Subsequently, in step S409, the application having the highest degree of suitability is proposed to the user. Therefore, then application that is the most suitable for the current usage state of the portable terminal 100 can be proposed to the user from among the plurality of candidates for background applications and operations that are time-consuming for the user can be eliminated. Additionally, in step S409, instead of presenting only the application that has the highest degree of suitability to the user, all applications that have a degree of suitability equal to or greater than the threshold may be presented to the user in order to allow the user to select the application to be executed. Additionally, it may be made possible to perform control so that applications are executed automatically in the background in the order of their degree of suitability, rather than presenting the application that has the highest degree of suitability to the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-034737, filed Mar. 4, 2021, which is hereby incorporated by reference wherein in its entirety.

What is claimed is:

1. An information processing apparatus capable of executing a plurality of applications at the same time comprising:
    an imaging sensor configured to obtain an image by photoelectrically converting object light; and
    at least one processor and/or circuit configured to function as the following units:
    a determination unit configured to determine whether or not a second application can be executed in a background while a first application is being executed; and
    an execution unit configured to execute the second application in the background,
    wherein the determination unit determines whether or not the second application can be executed in the background based on information about the first application and environmental suitability information during the execution of the first application,
    wherein the environmental suitability information is calculated based on an image obtained by capturing a user of the information processing apparatus by the imaging sensor during execution of the first application,
    wherein the environmental suitability information includes at least one of object information indicating a state of the user serving as an object in an image used in the second application and ambient light information indicating characteristics of the ambient light using the information processing apparatus, and
    wherein if the second application is an application that analyzes the state of the user based on the image obtained by capturing the user of the information processing apparatus by using the imaging sensor, the object information includes an exposure ratio of a specific region of the user to be analyzed.

2. The information processing apparatus according to claim 1, wherein the information about the first application is information for determining whether or not a usage state of the first application is a usage state that is suitable for executing the second application in the background.

3. The information processing apparatus according to claim 1, wherein the information about the first application is information that includes one or more items of information indicating category or identification information of the first application, an average usage time of the first application, current location information of the information processing apparatus executing the first application, and information indicating movement of the information processing apparatus during execution of the first application.

4. The information processing apparatus according to claim 1,
    wherein the determination unit manages information indicating start conditions of an application executable in the background, and
    wherein one or more items of information from among category or identification information of an application executed in the foreground for each application executable in the background, an average usage time of the application executable in the background, information about a location where the application executable in the background is executable, information indicating movement of the information processing apparatus upon the execution of the application executable in the background, and historical information about a degree of suitability indicating extent of the suitability for executing the application executable in the background of the application executed in the foreground, are managed to serve as information indicating the startup conditions.

5. The information processing apparatus according to claim 4, wherein the determination unit determines whether or not the second application is executable by determining whether or not the information about the first application acquired from the first application satisfies the startup conditions.

6. The information processing apparatus according to claim 1, wherein the object information includes any one or more items of information about a change in position, posture, and facial expression of the user.

7. The information processing apparatus according to claim 1, wherein the ambient light information includes any one or more items of information about brightness of the user, color temperature, a state of the light reflected by the user, and a change in the brightness of the user.

8. The information processing apparatus according to claim 1, wherein the determination unit calculates a degree of suitability indicating extent of the suitability for executing the second application in the background of the first application based on the environmental suitability information and compares the degree of suitability with a threshold to determine whether or not the second application can be executed in the background.

9. The information processing apparatus according to claim 8, wherein the determination unit records the suitability to serve as information about startup conditions that determine whether or not the second application can be executed in the background of the first application.

10. The information processing apparatus according to claim 1, wherein if there are a plurality of candidates for applications that can be executed in the background during execution of the first application, the determination unit determines a second application that is most suitable for being executed in the background of the first application from among the plurality of applications based on the information about the first application and the environmental suitability information.

11. The information processing apparatus according to claim 1, further comprising an imaging sensor configured to obtain an image by photoelectrically converting object light imaged through a lens,
wherein the lens is arranged on the same surface as the display unit of the information processing apparatus, and
wherein the second application is an application that analyzes the state of the user based on an image obtained by capturing the user of the information processing apparatus by using the imaging sensor.

12. The information processing apparatus according to claim 11, wherein the state of the user analyzed by the second application is biometric information of the user.

13. The information processing apparatus according to claim 1,
wherein the processor and/or the circuit further function as a display unit configured to display a screen on a display for allowing a user to select whether or not to execute the second application if the determination unit determines that the second application is executable, and
wherein if the user selects execution of the second application on the screen, the execution unit executes the second application in the background.

14. A method for controlling an information processing apparatus capable of executing a plurality of applications at the same time and including an imaging sensor configured to obtain an image by photoelectrically converting object light, the method comprising the steps of:
determining whether or not a second application can be executed in a background during the execution of the first application; and
executing the second application in the background,
wherein, in the step of determining, whether or not the second application can be executed in the background is determined based on information about the first application and environmental suitability information from during the execution of the first application,
wherein the environmental suitability information is calculated based on an image obtained by capturing a user of the information processing apparatus during execution of the first application,
wherein the environmental suitability information includes at least one of object information indicating a state of the user serving as an object in an image used in the second application and ambient light information indicating characteristics of the ambient light using the information processing apparatus, and
wherein if the second application is an application that analyzes the state of the user based on the image obtained by capturing the user of the information processing apparatus, the object information includes an exposure ratio of a specific region of the user to be analyzed.

15. A non-transitory recording medium storing a control program of an information processing apparatus capable of executing a plurality of applications at the same time and including an imaging sensor configured to obtain an image by photoelectrically converting object light, the method, the control program causing a computer to perform each step of a control method of the information processing apparatus, the method comprising the steps of:
determining whether or not the second application can be executed in a background during execution of the first application; and
executing the second application in the background,
wherein, in the step of determining, whether or not the second application can be executed in the background is determined based on information about the first application and environmental suitability information from during the execution of the first application,
wherein the environmental suitability information is calculated based on an image obtained by capturing a user of the information processing apparatus during execution of the first application,
wherein the environmental suitability information includes at least one of object information indicating a state of the user serving as an object in an image used in the second application and ambient light information indicating characteristics of the ambient light using the information processing apparatus, and
wherein if the second application is an application that analyzes the state of the user based on the image obtained by capturing the user of the information processing apparatus, the object information includes an exposure ratio of a specific region of the user to be analyzed.

* * * * *